US009689766B2

(12) United States Patent
Lemke et al.

(10) Patent No.: US 9,689,766 B2
(45) Date of Patent: Jun. 27, 2017

(54) PRESSURE SENSOR WITH COVER LAYER

(71) Applicant: Endress + Hauser GmbH + Co. KG, Maulburg (DE)

(72) Inventors: Benjamin Lemke, Berlin (DE); Rene Ziermann, Kleinmachnow (DE); Sebastian Pobering, Kleinmachnow (DE); Ralf Roder, Erfurt (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 127 days.

(21) Appl. No.: 14/432,528

(22) PCT Filed: Sep. 24, 2013

(86) PCT No.: PCT/EP2013/069763
§ 371 (c)(1),
(2) Date: Mar. 31, 2015

(87) PCT Pub. No.: WO2014/053350
PCT Pub. Date: Apr. 10, 2014

(65) Prior Publication Data
US 2015/0260596 A1  Sep. 17, 2015

(30) Foreign Application Priority Data
Oct. 1, 2012 (DE) .......................... 10 2012 109 325

(51) Int. Cl.
*G01L 19/04* (2006.01)
*G01L 9/06* (2006.01)
(Continued)

(52) U.S. Cl.
CPC ............ *G01L 9/065* (2013.01); *G01L 9/0042* (2013.01); *G01L 9/0052* (2013.01); *G01L 9/085* (2013.01)

(58) Field of Classification Search
CPC ....... G01L 9/0052; G01L 9/025; G01L 9/065; G01L 9/085
(Continued)

(56) References Cited

U.S. PATENT DOCUMENTS

| 4,622,856 A | 11/1986 | Binder |
| 6,422,088 B1 * | 7/2002 | Oba .......................... G01D 3/08 73/754 |

(Continued)

FOREIGN PATENT DOCUMENTS

| CN | 1474938 A | 2/2004 |
| CN | 1596367 A | 3/2005 |

(Continued)

OTHER PUBLICATIONS

German Search Report, German Patent Office, Munich, DE, Oct. 26, 2012.
(Continued)

*Primary Examiner* — Benjamin Schmitt
(74) *Attorney, Agent, or Firm* — Bacon & Thomas, PLLC

(57) ABSTRACT

A pressure sensor, comprising: a substrate having a measuring membrane, and an electrically conductive cover layer, which has electrical contact elements and is electrically isolated from the substrate by an insulating layer. The cover layer is divided in such a manner that two independent measurements of the respective resistance between two contact elements are possible in two regions electrically isolated from one another. The regions of the cover layer serve to shield external electromagnetic influences from the sensor elements of the measuring membrane, to detect damage to the measuring membrane, as well as for determining exact temperature.

8 Claims, 2 Drawing Sheets

(51) Int. Cl.
*G01L 9/08* (2006.01)
*G01L 9/00* (2006.01)
(58) Field of Classification Search
USPC .................................................. 73/708, 727
See application file for complete search history.

(56) References Cited

U.S. PATENT DOCUMENTS

| | | |
|---|---|---|
| 7,137,304 B2 | 11/2006 | Martin |
| 7,861,598 B2 | 1/2011 | Drewes |
| 8,384,170 B2 | 2/2013 | Getman |
| 2007/0148788 A1 | 6/2007 | Hsieh |
| 2009/0013792 A1 | 1/2009 | Qiao |
| 2012/0241822 A1 | 9/2012 | Takenaka |

FOREIGN PATENT DOCUMENTS

| | | | |
|---|---|---|---|
| CN | 1977154 A | 6/2007 | |
| CN | 101627292 A | 1/2010 | |
| CN | 102683426 A | 9/2012 | |
| DE | 3041756 A1 | 6/1982 | |
| DE | 3319605 A1 | 12/1984 | |
| DE | 10346576 A1 | 5/2005 | |
| DE | 102007014468 A1 | 9/2008 | |
| EP | 2498075 A2 | 9/2012 | |
| WO | 0240957 A1 | 5/2002 | |

OTHER PUBLICATIONS

International Search Report, EPO, The Netherlands, Apr. 11, 2014.
English Translation of the International Preliminary Report on Patentability, WIPO, Geneva, CH, Apr. 16, 2015.

\* cited by examiner

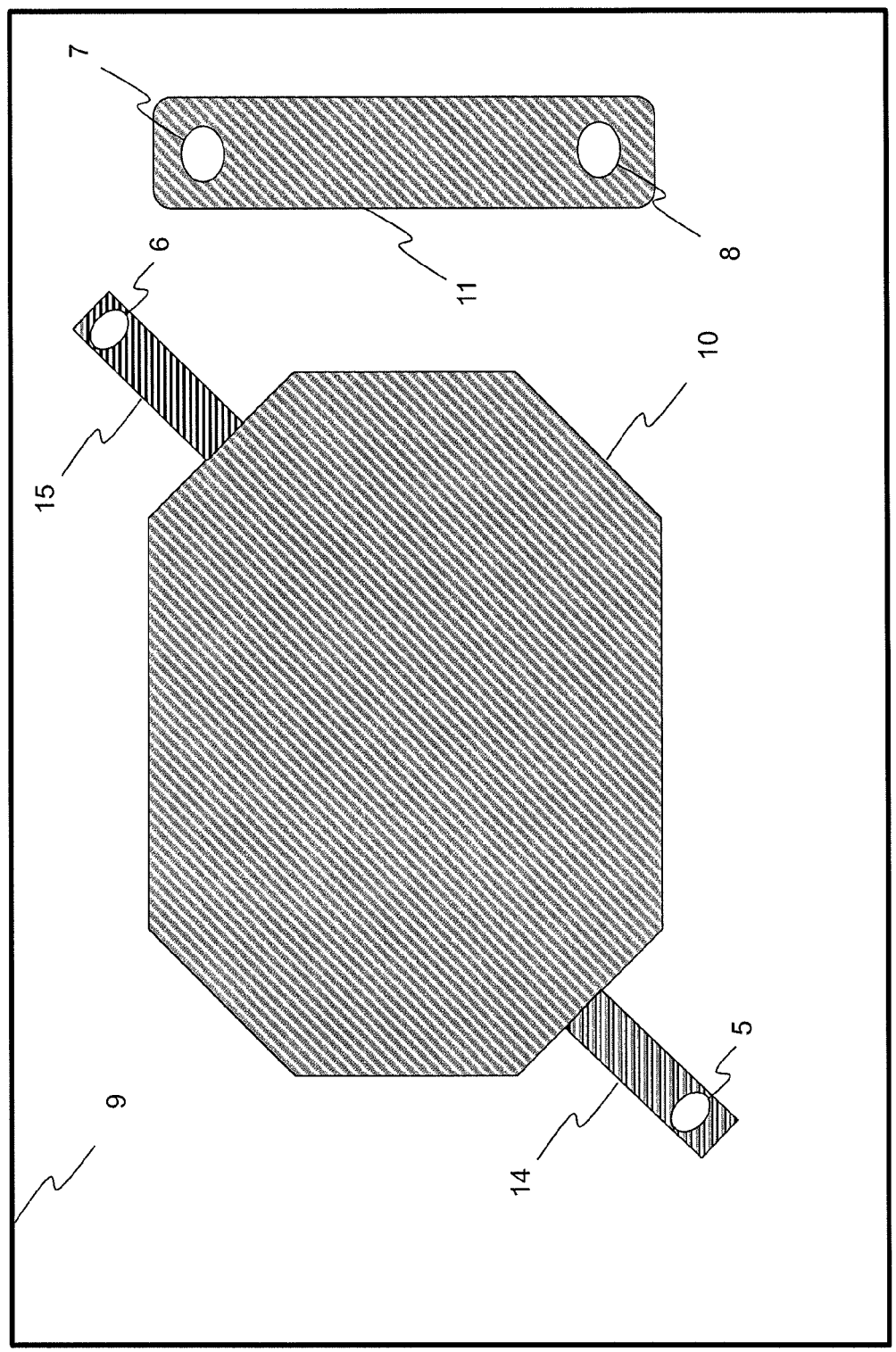

PRESSURE SENSOR WITH COVER LAYER

TECHNICAL FIELD

The invention relates to a pressure sensor comprising: a substrate with a thin bending plate formed therein and integrated measuring elements; and an electrically conductive cover layer, which has electrical contact elements and is electrically isolated from the substrate by an insulation layer.

BACKGROUND DISCUSSION

Pressure sensors are frequently embodied as semiconductor sensors. These are based, as a rule, on silicon. In such case, pressure sensor chips can be formed in a simple manner, and include, most often, a substrate and a thin bending plate formed therein by microstructuring and provided with integrated measuring elements. A pressure acting on the thin bending plate effects a pressure-dependent deflection. The integrated measuring elements react with a resistance change, which is registered as an electrical measurement signal. This provides a signal for additional processing and evaluation.

The sensor elements are embodied, in such case, as a rule, as piezoresistive elements, especially as resistances. It is known to manufacture these elements in silicon with the assistance of doping methods, such as, for example, diffusion or implantation. Thus, the piezoresistive elements can be embodied, for example, as a p conducting region in an n conducting silicon substrate.

Pressure sensors are exposed during operation to high loadings, such as, for example, pressure pulses, durably high pressures and strong temperature fluctuations. Pressure pulses and durably high pressures can lead to material fatigue and finally to fracture of the membrane and therewith to failure of the sensor.

Membrane fracture detection is, in such case, difficult, since an incorrect measured value can likewise be caused by other problems in the sensor, in the circuit or other used element or, in given cases, not be recognized at all.

For compensating the temperature dependence of the measurement signal, according to the state of the art, the temperature is determined by measuring a resistance change, for example, that of the measuring elements interconnected in a Wheatstone bridge. In such case, using the measured temperature and the earlier determined temperature dependence of the measurement signal, the temperature influence can be compensated. This technique has the disadvantage that also a pressure change leads to a resistance change. This makes a direct correlation between resistance change and temperature change difficult.

Moreover, a temperature coefficient of resistances used for measuring is selected in such a manner that, for a temperature range for which the sensor is designed, the temperature coefficient does not change sign. Upon a sign change, application of the bridge circuit for temperature determination becomes impossible, since the temperature must be determined injectively.

Besides compensating the temperature dependence of the measurement signal, known in the state of the art is also to protect against disturbing influences. For this, a shielding in the form of a conductive cover layer is applied on the membrane surface, in order to suppress external electrical disturbing influences, to the extent that the cover layer lies at the same potential as the substrate. For improving the stability of the output signal, consequently, frequently electrical shielding is applied, with which at least the sensor elements are covered. Metal shielding, however, likewise influences the measurement signal, so that, especially at high temperatures, non-reproducible deviations of the measurement signal can occur.

A material frequently applied for electrical shielding is doped polysilicon. Many material properties of polysilicon are very similar to those of single crystal silicon. These material properties include, among others, the thermal expansion coefficient, the hardness, as well as the modulus of elasticity and the shear modulus. Applied as doping material for polysilicon are, for example, boron or phosphorus.

The doping occurs, for example, by diffusion, implantation or by addition of a gas during deposition of the cover layer serving as shielding. Since the cover layer serves for temperature determination, a low doping is advantageous, in order to achieve a high resistance. A low doping has additionally a stronger temperature dependence than a high doping and produces, thus, a signal with sufficient range for temperature determination.

Advantageous for the sensor elements is, in contrast, a high doping, since this provides a lesser temperature dependence. Thus, the sensor elements cannot be used optimally simultaneously for pressure and temperature measurement.

SUMMARY OF THE INVENTION

Thus, an object of the invention is to provide a pressure sensor, which optimizes the process of pressure and temperature measurement and, in such case, especially compensates measurement error and permits failure detection.

The invention solves the object by features including that it achieves the three tasks by three optimized resistance measurements. In such case, the low doped cover layer is divided in such a manner that respective resistances are measurable in two regions electrically isolated from one another and the measuring resistances in the thin bending plate have a high doping.

A special advantage of the invention compared to the state of the art is that the cover layer is divided into two regions electrically isolated from one another. In such case, each region is provided with electrical contact elements, this meaning thus that in each of the two regions the resistance is determinable independently of the other region.

The electrically isolated regions are, in such case, simply formable from the cover layer already known in the state of the art. The cover layer is deposited according to the state of the art 2-dimensionally and is without other structure. According to the invention, the insulated regions are formed in an additional manufacturing step, for example, in the form of a lithographic method and/or an additional etching process. The cover layer is, in such case, preferably deposited as polysilicon. The cover layer is deposited, for example, on an oxide or oxide-nitride layer on the measuring membrane manufactured for this, in order to obtain a sufficient electrical insulation between the cover layer and the measuring membrane.

In an especially advantageous form of embodiment of the invention, a first multifunctional, resistive region of the cover layer is embodied, for example, as a shield and covers the thin bending plate with the measuring elements completely or partially and a second resistive region of the cover layer is embodied, for example, as a thermistor and mechanically decoupled from the measuring membrane. In this way, an option is, in a simple working step, for example, a lithographic method and/or etching process, to build a shield and simultaneously a thermistor, which can be contacted independently of one another, and whose resistances can be determined.

Especially advantageous in this form of embodiment is that the thin bending plate with the measuring elements and the cover layer can have different dopings, wherein the measuring membrane formed of silicon is embodied, in such case, with a smaller doping. Thus, the doping of the thermistor differs from the doping of the sensor elements and enables an isolated optimizing of the two functional units. The doping plays a lesser role for the shielding and it is not disadvantageous to match the doping of the shield to that of the thermistor, so that the two can be deposited in one process step and constructed from the same thin film.

A further advantage is that the piezoelements of the measuring membrane can be provided with a higher doping than possible in the state of the art. This means that the pressure sensor is suitable for higher working temperatures. Higher doping of the piezoelements reduces leakage currents and therewith increases the signal quality of the output signal.

Especially advantageous in such case is that the thermistor region of the cover layer is formable outside of the measuring membrane on the upper surface of the pressure sensor. In such case, the thermistor is exposed to smaller mechanical stresses, whereby errors in a temperature measurement signal of the thermistor due to mechanical stress are reduced or excluded.

The pressure sensor supplementally permits error, respectively failure, detection. In such case, the resistance of the shield region of the cover layer can be determined and separately therefrom the temperature can be determined via the thermistor region of the cover layer. In contrast to the state of the art, it is, thus, possible to know whether a change of the resistance in the shield region of the cover layer is attributable to a temperature fluctuation or to a membrane fracture. If a membrane fracture is present, the resistance of the cover layer changes erratically in contrast to that of the thermistor. If the temperature fluctuates, the resistances of both regions change. For this, it is especially advantageous to build the thermistor region of the cover layer isolated from the membrane region.

Further provided is a method for application of a pressure sensor having a substrate, a measuring membrane and a divided, electrically conductive, cover layer, which has two regions and electrical contact elements, wherein a resistance of the first resistive region of the cover layer is measured, from the measured resistance the temperature of the cover layer is determined and with the assistance of this temperature value a temperature dependence of a pressure measurement signal of the pressure sensor is compensated.

In an advantageous form of embodiment, the method includes measuring the resistance of the first resistive region of the cover layer and in the case of a change of the resistance indicating damage to the cover layer and/or the measuring membrane.

Another advantageous embodiment of the invention provides that the second resistive region of the cover layer shields sensor elements of the measuring membrane from external electrical fields and movable charge carriers.

Other features, details and advantages of the invention will become evident from the description of examples of embodiments based on the figures.

BRIEF DESCRIPTION OF THE DRAWINGS

The invention will now be explained in greater detail with reference to preferred examples of embodiments shown in the drawing, the figures of which show as follows:

FIG. 2 is schematically, a plan view of the pressure sensor provided with the cover layer constructed as two regions.

DETAILED DISCUSSION IN CONJUNCTION WITH THE DRAWINGS

Figure 1:
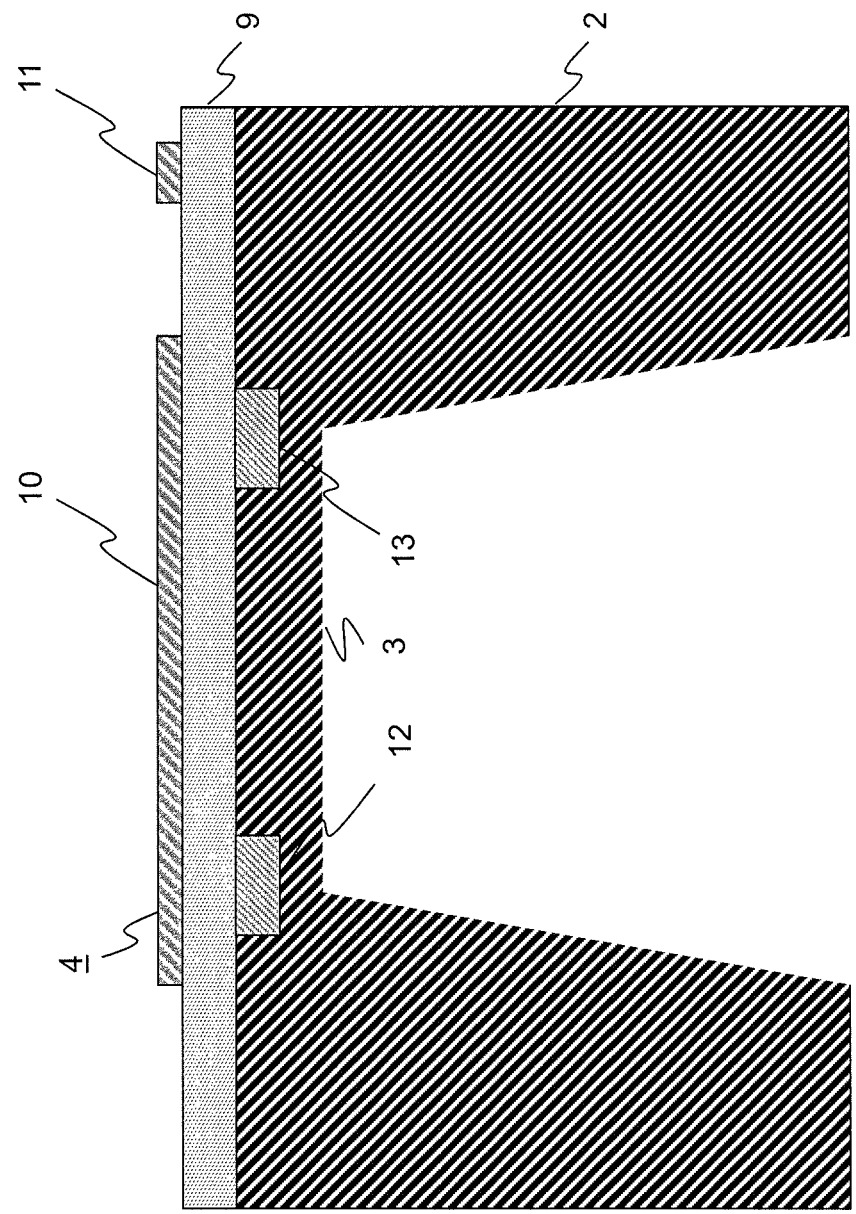
FIG. 1 is schematically, a cross section of a pressure sensor provided with a cover layer.

The reference characters and their meaning are set forth in the List of Reference Characters. Generally, equal reference characters refer to equal parts.

FIG. 1 shows in schematic representation a cross section of a pressure sensor 1, comprising a substrate 2, wherein, for example, by an etching process, a thin bending plate 3 is formed in the substrate 2. For most applications, the measuring membrane 3 and the substrate 2 are silicon.

The upper surface of the pressure sensor 1 is provided with a cover layer 4, which has contact elements 5, 6, 7, 8. In order to isolate the cover layer 4 electrically from the substrate 2 in the illustrated form of embodiment, an insulation layer 9 is provided between the substrate 2 and the cover layer 4. The insulation layer 9 is, for example, oxide or oxide-nitride. The cover layer 4 is divided into a first resistive region 10 and a second resistive region 11. Used for dividing the cover layer 4 is, for example, a lithographic method and/or an etching process. The regions 10, 11 of the cover layer 4 are provided with the contact elements 5, 6, 7, 8, via which the resistances of the individual regions 10, 11 are separately determinable. The first region 10 is in this form of embodiment embodied as a shield, which shields against influences of external electrical fields and movable charge carriers on the measuring elements and serves for failure detection. The second region 11 is embodied as a thermistor and serves for determining temperature of the cover layer 4.

The thin bending plate 3 is provided with measuring elements 12, 13, wherein the measuring elements 12, 13 illustrated here are embodied as piezoresistive sensor elements. These are produced in the thin bending plate 3 using ion implantation and subsequent curing. The measuring elements 12, 13 transduce, in such case, a deflection of the thin bending plate 3 by a pressure to be measured into an electrical signal, which is sent via corresponding connection lines for additional processing.

FIG. 2 shows in schematic representation a plan view of the pressure sensor 1, wherein the substrate 2 bears the insulation layer 9 and the insulation layer 9 is provided with the cover layer 4. The cover layer is divided into two regions 10, 11.

The first region 10 has leads 14, 15, which extend arm like from the region 10 and are provided with the contact elements 5, 6. With help of the contact elements 5, 6, an electrical voltage can be placed across the first region 10 and/or the resistance of the region 10 determined.

The first region 10 covers the region of the thin bending plate 3 of the substrate 2, in order, on the one hand, to assure a good shielding from external electrical fields and movable charge carriers and, on the other hand, to experience a sufficient resistance change in the case of damage to the thin bending plate 3, in order that the damage will be unequivocally indicated. The shielding occurs by applying a potential to the first region 10. The failure detection, respectively the detecting of damage to the cover layer 4 and/or to the thin bending plate 3, is enabled by monitoring the resistance of the first region 10 of the cover layer 4, since in the case of damage to this region, the resistance changes independently of a temperature change significantly and erratically.

The second region 11 is embodied isolated from the first region 10 externally of the region of the thin bending plate of the substrate 2. The separation permits using the second region 11 for temperature measurement without that pressure-dependent influences upon the supplying of the thin bending plate 3 with a pressure to be measured corrupt the measuring. Furthermore, the second region 11 is provided with contact elements 7, 8, in order to determine the resistance of the second region. From the resistance, with the assistance of its temperature dependence, the temperature is determined. The insulation layer 9 is only electrically insulating, while heat exchange between the thin bending plate 3 and the cover layer 4 occurs unimpeded. As a result, the temperature of the cover layer 4 corresponds also to the temperature of the thin bending plate 3. With the help of the temperature determined via the second region 11, on the one hand, a temperature curve of the measurement signal of the measuring elements 12, 13 can be compensated, and, on the other hand, the resistance and/or the therefrom determined temperature serves upon a resistance change of the first region 10 for checking the cover layer 4 or as a reference for indicating damage to the cover layer 4 and/or the thin bending plate 3.

The invention claimed is:

1. A pressure sensor, comprising:
   a substrate having a measuring membrane formed therein and equipped with sensor elements; and
   an electrically conductive cover layer, comprising: low doped polysilicon, wherein:
   said cover layer has electrical contact elements and is electrically isolated from said substrate by an insulation layer;
   said cover layer is divided in such a manner that respective resistances are measurable in a first region and a second region electrically isolated from one another, and
   both said first region and also said second region of the cover layer are provided respectively with at least two contact elements for electrical contacting.

2. The pressure sensor as claimed in claim 1, wherein:
   a first resistive region of said cover layer completely or partially covers said measuring membrane and the first resistive region of the cover layer shields sensor elements of the measuring membrane against external electrical fields;
   a second resistive region of said cover layer is so arranged that mechanical reaction of said measuring membrane on it is negligibly small.

3. The pressure sensor as claimed in claim 1, wherein:
   said cover layer and said sensor elements have different dopings.

4. The pressure sensor as claimed in claim 1, wherein:
   said cover layer is deposited on said insulation layer and divided by a lithographic and/or etching method.

5. The pressure sensor as claimed in claim 1, wherein:
   said sensor elements are implanted, highly doped, piezoresistive sensor elements.

6. A method for applying a pressure sensor comprising a substrate, a measuring membrane and a divided, electrically conductive, cover layer, which has two regions and an electrically conductive cover layer, wherein the cover layer has electrical contact elements and is electrically isolated from the substrate by an insulation layer, the cover layer is divided in such a manner that respective resistances are measurable in two regions electrically isolated from one another, wherein both the first region and also the second region of the cover layer are provided respectively with at least two contact elements for electrical contacting, wherein the cover layer is composed at least partially or completely of polysilicon, wherein a first resistive region of the cover layer completely or partially covers the measuring membrane and the first resistive region of the cover layer shields sensor elements of the measuring membrane against external electrical fields, wherein a second resistive region of the cover layer is so arranged that mechanical reaction of the measuring membrane on it is negligibly small and,
   the method comprising the steps of:
   measuring a resistance of the second resistive region of the cover layer;
   determining the temperature of the cover layer from the measured resistance; and
   with the assistance of said determined temperature a temperature dependence of a pressure measurement signal of the pressure sensor is compensated.

7. The method as claimed in claim 6, wherein:
   the resistance of the first resistive region of the cover layer is measured and, in the case of a change of the resistance, damage to the cover layer and/or the measuring membrane is indicated.

8. The method as claimed in claim 6, wherein:
   a pressure dependent signal is determined via the optimized' measuring elements.

* * * * *